July 28, 1970  F. REEKS  3,521,652

INERTIA-OPERATED VALVE

Filed March 8, 1968

INVENTOR
FRANK REEKS
BY
Woodhams, Blanchard & Flynn
ATTORNEYS

United States Patent Office 3,521,652
Patented July 28, 1970

3,521,652
INERTIA-OPERATED VALVE
Frank Reeks, Ewshot, England, assignor to
C. B. Associates Limited
Filed Mar. 8, 1968, Ser. No. 711,743
Claims priority, application Great Britain, Apr. 7, 1967,
16,116/67
Int. Cl. F16k *17/36*
U.S. Cl. 137—38                              11 Claims

ABSTRACT OF THE DISCLOSURE

A valve operated by an inertia mechanism in which operation of the valve to control a flow of fluid is effected when a force of determined magnitude is applied to the inertia mechanism.

---

The invention relates to valves operated by inertia mechanisms that is to say mechanisms operated by movement of the mechanism as a whole, for example by tilting, impact, vibration or association.

Such a mechanism, comprising a switch is described in our copending application 645,012 for controlling electrical contacts, whereby a circuit is made or broken when the switch is operated.

According to the invention a valve operated by an inertia mechanism comprises a casing, for example of metal or plastics material, defining a frustoconical seating, a magnet positioned adjacent the apex of the seating and a ball of magnetic material adapted to be held in the frustoconical seating by the magnet until dislodged by a force of determined magnitude applied to the valve, thereby causing the ball to move a valve member axially to control a flow of fluid.

Thus the valve member may be of elongated form with one end engaged by the ball and the other end of conical or hemispherical form and adapted to cooperate with a seating provided in a fluid supply line, to permit or prevent flow of fluid through the line according to the position of the valve member.

In one construction the magnet is cylindrical and adjustable. In alternative construction the magnet may be fixed and of cylindrical form, or fixed or adjustable and of square cross section, or U-shaped.

The invention has particular application to the control of the fuel supply to internal combustion engines in vehicles, whereby the fuel supply can be automatically discontinued on an impact, as in an accident, to reduce the fire risk. Valves according to the invention are not however limited to this application and could for example be used to initiate the supply of a fluid, such as a fire extinguishing fluid, on violent impact.

Figure 1:
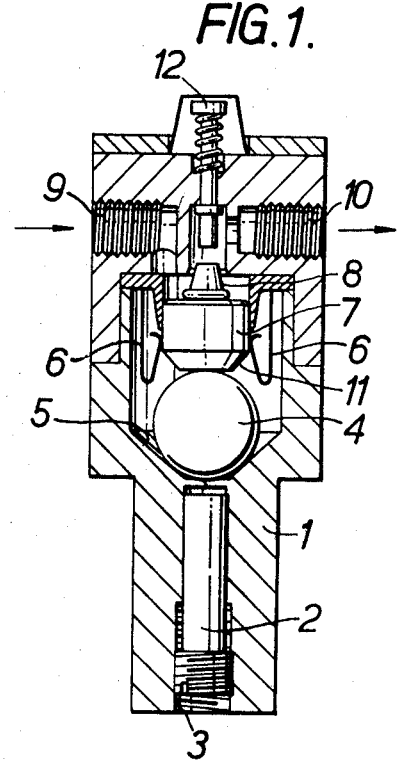
Figure 2:
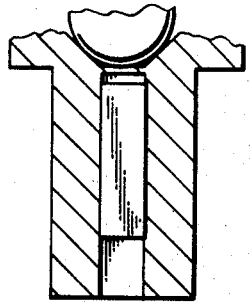
Figure 3:
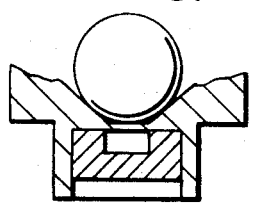

The invention is diagrammatically illustrated by way of example in the accompanying drawings, in which:

FIG. 1 is a section through a valve according to one construction of the invention, and FIGS. 2 and 3 show alternative arrangements of the base portion of the inertia mechanism.

As shown in FIG. 1 the valve comprises a casing 1, advantageously of metal, and containing a cylindrical magnet 2, axially movable in a bore 3 of the casing 1, and attracting a seismic mass, formed as a ball 4, towards the apex of a conical seating 5. Springs 6 hold a valve shuttle 7 adjacent the ball 4 and in a position so that a dome shaped end 8 on an O-seal, on the end of the valve shuttle 7 remote from the ball 4, does not obstruct a passageway formed between an inlet port 9 and an outlet port 10, through which passageway a fluid may pass, as, for example, fuel being supplied to an internal combustion engine.

The end 11 of the valve shuttle 7 adjacent the ball 4 is provided to be frustoconical and a sealed, spring loaded reset member 12 is provided to reset the valve.

In use the valve remains in a state of reset as shown until a violent impact, tilting or vibration shocks the ball 4 loose from the seating 5 and causes the ball 4 to strike, and exert a force on, the valve shuttle 7. The valve would be operated, for example, by impact of a magnitude such as would be caused by a serious automobile accident, aeroplane crash, or the like or should vibration of machinery on which the valve is mounted become excessive.

The valve shuttle 7 then moves upwardly, as shown in the drawing, to obstruct the passageway between the ports 9 and 10 by means of the end 8 engaging a seating. It is held in this position by the springs 6 engaging the frusto-conical end 11 of the valve shuttle 7, the springs thus acting as a resilient detent device for holding valve shuttle 7 in its upward position. Flow of fuel is thus prevented and the fire risk lessened. The mechanism may be reset to the position shown in the drawing by depressing the reset member 12.

In the alternative construction illustrated in FIG. 2 a fixed magnet of square cross section is used and in FIG. 3 a fixed U-shaped magnet.

The invention may also be utilized in process machinery by providing a fluid shut-off in case of excessive vibration and in bulk transport where a normally closed construction provides a crash cut-in for fire-foam or water dilution.

I claim:

1. An inertia-operated valve, comprising:
   casing means having a frustoconical seat therein;
   a valve member mounted in said casing means for movement between first and second positions for controlling the flow of a fluid;
   means coacting with said valve member for moving same from the first position to the second position in response to a predetermined shock force being imposed on said inertia-operated valve, said means comprising a ball of magnetic material normally positioned in engagement with said frustoconical seat with said ball being movable away from said seat in response to said predetermined shock force for contacting said valve member for moving same from said first to said second position;
   magnet means disposed adjacent the apext of said frustoconical seat for normally maintaining said ball in engagement with said seat; and
   releasable holding means coacting with said valve member when said valve member has been moved to said second position for holding said valve member in said second position.

2. A valve according to claim 1, in which the valve member, is of elongated form with one end engaged by the ball, the other end being of conical form and adapted to cooperate with a seating provided in a fluid supply line to control flow of fluid through the line.

3. A valve according to claim 1, in which the casing means includes a bore therein with said magnet means being positioned within said bore, and means coacting with said casing means for adjustably positioning said magnet means within said bore.

4. A valve according to claim 1, in which the magnet is of an elongated, cylindrical configuration.

5. A valve according to claim 1, in which the magnet is U-shaped.

6. A valve according to claim 1, in which the end of the valve member remote from the ball is dome shaped.

7. A valve according to claim 1, further including reset means for causing said valve member to be displaced from said second position to return to said first position, said reset means including a plunger slidably mounted on said casing means and disposed for engagement with said valve member for causing said valve member when in said second position to be released by said releasable holding means.

8. A valve according to claim 1, wherein said releasable holding means includes spring means coacting with said valve member for resiliently maintaining said valve member in said second position after said valve member has been moved to said second position by being contacted by said ball.

9. A valve according to claim 8, wherein said spring means additionally maintain said valve member in said first position prior to said inertia-operated valve being subjected to said predetermined shock force.

10. A valve according to claim 1, wherein said releasable holding means includes resilient detent means coacting between said casing means and said valve member for resiliently but releasably maintaining said valve member in said second position when said valve member is moved to said second position by being contacted by said ball.

11. A valve according to claim 1, further including spring means coacting with said valve member for maintaining said valve member in said first position prior to said inertia-operated valve being subjected to said predetermined shock force.

References Cited

UNITED STATES PATENTS

| | | | |
|---|---|---|---|
| 1,213,676 | 1/1917 | Miner | 137—38 |
| 1,414,339 | 5/1922 | Cochrane | 137—38 X |
| 2,325,725 | 8/1943 | Wood | 137—38 |
| 2,436,396 | 2/1948 | McCaslin. | |
| 2,529,770 | 11/1950 | Hanson | 137—38 |
| 2,671,832 | 3/1954 | Hansard | 73—492 X |
| 2,676,708 | 4/1954 | Risk | 137—38 X |
| 2,898,415 | 8/1959 | Clurman. | |

CLARENCE R. GORDON, Primary Examiner

U.S. Cl. X.R.

73—492; 123—198; 200—61.45